United States Patent
Praden

(10) Patent No.: US 8,774,405 B2
(45) Date of Patent: Jul. 8, 2014

(54) SUBSCRIBER IDENTITY MODULE AND ASSOCIATED BROADCASTING SERVER ADAPTED FOR MANAGING PROGRAMS HAVING UNDEFINED DURATION

(75) Inventor: Anne-Marie Praden, Ventabren (FR)

(73) Assignee: Gemalto SA, Meudon (FR)

( * ) Notice: Subject to any disclaimer, the term of this patent is extended or adjusted under 35 U.S.C. 154(b) by 568 days.

(21) Appl. No.: 12/746,734

(22) PCT Filed: Dec. 4, 2008

(86) PCT No.: PCT/EP2008/066770
§ 371 (c)(1),
(2), (4) Date: Jul. 26, 2010

(87) PCT Pub. No.: WO2009/071616
PCT Pub. Date: Jun. 11, 2009

(65) Prior Publication Data
US 2010/0306795 A1  Dec. 2, 2010

(30) Foreign Application Priority Data
Dec. 7, 2007 (EP) .................................... 07 301647

(51) Int. Cl.
*H04N 7/167* (2011.01)
*G06F 21/00* (2013.01)
*H04N 7/16* (2011.01)
*H04H 60/23* (2008.01)
*H04H 60/11* (2008.01)
*H04H 60/32* (2008.01)
*H04H 60/40* (2008.01)
*H04N 5/782* (2006.01)
*H04L 29/06* (2006.01)
*G06F 21/10* (2013.01)

(52) U.S. Cl.
CPC .............. *H04H 60/23* (2013.01); *H04H 60/11* (2013.01); *H04H 60/32* (2013.01); *H04H 60/40* (2013.01); *G06T 2201/0064* (2013.01); *H04N 5/782* (2013.01); *H04L 2209/601* (2013.01); *H04L 63/0428* (2013.01); *H04L 2463/101* (2013.01); *G06F 21/10* (2013.01)
USPC ........... 380/230; 380/201; 380/211; 380/232; 380/233; 380/229; 713/182; 725/29; 725/31

(58) Field of Classification Search
CPC ...................... G06T 1/0028; G06T 2201/0064; H04N 5/782; H04N 21/23892; H04N 21/8358; H04L 2209/608; H04L 2209/08; H04L 2209/34; H04L 63/0428; H04L 2463/101; H04L 63/068; H04L 2209/601; G06F 21/10; H04H 60/23; H04H 60/11; H04H 60/32; H04H 60/40
USPC ......................................................... 380/230
See application file for complete search history.

(56) References Cited

U.S. PATENT DOCUMENTS 5,553,141 A * 9/1996 Lowry et al. ................... 380/216
5,974,222 A * 10/1999 Yuen et al. ..................... 386/249
(Continued)

FOREIGN PATENT DOCUMENTS

EP      0898425 A3 *  1/2000  ............. H04N 7/167
EP      1 621 959 A1    2/2006
(Continued)

OTHER PUBLICATIONS

International Search Report (PCT/ISA/210) dated Jan. 20, 2009.

*Primary Examiner* — Carolyn B Kosowski
(74) *Attorney, Agent, or Firm* — Buchanan Ingersoll & Rooney P.C.

(57) ABSTRACT

The invention relates to a value-added service applied to the broadcasting of video programs or content and more particularly to mobile television (Mobile TV). The invention promotes service continuity during the broadcasting of programs having an undefined duration and the broadcasting of which has been subject to a Pay-Per-View type purchase.

11 Claims, 5 Drawing Sheets

(56) References Cited

U.S. PATENT DOCUMENTS

| | | | |
|---|---|---|---|
| 6,920,559 B1* | 7/2005 | Nessett et al. | 713/168 |
| 6,981,147 B1* | 12/2005 | Hamann et al. | 713/175 |
| 7,028,180 B1* | 4/2006 | Aull et al. | 713/156 |
| 7,035,826 B2* | 4/2006 | Hamada et al. | 705/51 |
| 7,181,612 B1* | 2/2007 | Pellacuru et al. | 713/153 |
| 7,237,108 B2* | 6/2007 | Medvinsky et al. | 713/160 |
| 7,296,162 B2* | 11/2007 | Wajs | 713/178 |
| 7,945,504 B1* | 5/2011 | Lloyd et al. | 705/37 |
| 8,045,540 B2* | 10/2011 | Bajko et al. | 370/352 |
| 8,190,874 B2* | 5/2012 | Minamizawa | 713/150 |
| 8,526,614 B2* | 9/2013 | Moreillon et al. | 380/255 |
| 2003/0074565 A1 | 4/2003 | Wasilewski et al. | |
| 2003/0099360 A1* | 5/2003 | Hoang | 380/277 |
| 2003/0177365 A1* | 9/2003 | Buhan et al. | 713/182 |
| 2005/0249219 A1* | 11/2005 | Bajko et al. | 370/395.3 |
| 2006/0026103 A1 | 2/2006 | Lee | |
| 2006/0126848 A1* | 6/2006 | Park et al. | 380/277 |
| 2007/0162981 A1* | 7/2007 | Morioka et al. | 726/30 |
| 2007/0274525 A1* | 11/2007 | Takata et al. | 380/270 |
| 2008/0271103 A1* | 10/2008 | Praden | 725/116 |
| 2008/0295140 A1* | 11/2008 | Praden | 725/93 |
| 2008/0307217 A1* | 12/2008 | Yukimatsu et al. | 713/150 |
| 2009/0006584 A1* | 1/2009 | Gregoire et al. | 709/220 |
| 2009/0158028 A1* | 6/2009 | Jung et al. | 713/155 |
| 2009/0328099 A1* | 12/2009 | Praden et al. | 725/39 |
| 2010/0199332 A1* | 8/2010 | Bachmann et al. | 726/4 |
| 2010/0306795 A1* | 12/2010 | Praden | 725/31 |
| 2010/0319022 A1* | 12/2010 | Praden | 725/34 |
| 2011/0185377 A1* | 7/2011 | Praden et al. | 725/24 |
| 2012/0124605 A1* | 5/2012 | Praden | 725/14 |

FOREIGN PATENT DOCUMENTS

| | | | | |
|---|---|---|---|---|
| EP | 0898425 B1 * | 3/2007 | | H04N 7/167 |
| JP | 2005-94244 A | 4/2005 | | |
| JP | 2005-217700 A | 8/2005 | | |

\* cited by examiner

SUBSCRIBER IDENTITY MODULE AND ASSOCIATED BROADCASTING SERVER ADAPTED FOR MANAGING PROGRAMS HAVING UNDEFINED DURATION

The invention relates to an added value service applied to the broadcasting of video programs or contents, more particularly to mobile television (Mobile TV). Through this type of technology, the user of a mobile telephone may, for example, watch a video programme on the screen of his/her telephone and possibly listen to same through an earpiece or a pair of glasses communicating, through a wire or wireless link, with said telephone.

To provide this type of application, telecommunication operators use dedicated resources such as a video broadcast server (TV broadcast server), a mobile radio telecommunication network and/or a broadcast network, content servers and remote servers to contain secrets.

The operators use, for invoicing said service, a personal object in order to identify the user wishing to receive a mobile television service. The personal object is a subscriber identity module preferably in the form of a chip card known as the acronym UICC (Universal Integrated Circuit Card). This card supports an application of the SIM (Subscriber Identity Module) type in connection with the mobile telecommunication terminal. The mobile communication terminal gets connected to a network generally of the GSM/GPRS (Global System for Mobile Communications/General Packet Radio Service) types.

The subscriber identity module can also be in the form of a card of the MMC (Multi-Media Card) or SD (Secure Digital) types or even in the form of a dongle or a key connected to a terminal using, for example, the USB (Universal Serial Bus) protocol. Said module, whatever the type thereof, has the required personal data so that the user can use the video programme broadcast service.

The invention more particularly applies, in a non-limitative way, to the DVB (Digital Video Broadcasting), DMB (Digital Multimedia Broadcasting), ISDB-T (Integrated Services Digital Broadcasting-terrestrial) and MBMS (Mobile Broadcast Multicast Service) broadcast networks. The users owning appropriate terminals receive video programmes broadcast through such networks. Said programmes are broadcast without any distinction to the whole fleet of terminals. If programmes are not copyrighted (or broadcast without encoding) everyone can view them. Other programmes, also called charged programmes, require one individual subscription per user. If a user has not taken out such a subscription, he/she will not be able to view the charged programme.

The video programmes are broadcast in the form of continuous flows set up by one or several content providers. The audio flow and the video flow are synchronised using timestamps (Timestamps).

The broadcast service may however be partially customised using in particular the ESG (Electronic Service Guide). Using the ESG, information characterising the video programmes can be communicated, and some of this information can be displayed in the form of menus on the screen of the terminal. In addition, it is further possible to transmit using the ESG information taking into account the user's geographic location (for example, dates of concerts). The ESG thus brings interactivity to the programmes. The user can obtain additional information on the programmes or even be requested to vote during a programme or even to make an electronic purchase. He/she may also indicate the language of the programmes he/she wishes to view. The ESG is also an interesting promotion means for the broadcast operator. Interactivity may also be carried in other broadcast messages, also called notification messages.

The so-called charged contents of programmes are transmitted enciphered. A traffic key, which makes it possible to decipher the content, is transmitted simultaneously with said content. The traffic key varies over time. It is also enciphered by the contents provider. To decipher the traffic key and thus decipher the content, the user's subscriber identity module includes one or several decipherment keys, also called service keys. To have such service keys, it is necessary for said user to have taken out a subscription.

The subscriptions may be of different kinds. A subscription may be monthly or based on a shorter or a longer period of time. The user may also choose a "Pay-per-View" type formula for which he or she pays to view a particular programme. Other formulas exist, such as the purchase of tokens, used whenever required during the viewing time. The service key associated with a "pay-per-view" type service is called PEK (Programme Encryption Key). The service key associated to the duration of a subscription is called SEK (Service Encryption Key). Service keys are generally communicated through a telecommunication operator's network who owns the user's identity module. The service keys can also be broadcast through the content broadcast network or be transmitted in a point-to-point mode on a WIFI (Wireless Fidelity) or ADSL (Asymmetric Digital Subscriber Line) type network. Service keys show the capacity of the user to view and to listen to contents.

More particularly, in the case of the purchase of programmes (of the Pay-Per-View type), the user/subscriber receives from the broadcast server, a key PEK associated with the period of validity equal to the duration of the programme. Thus, let us take for example a football game. The regulatory duration of a football match is equal to 90 minutes. More precisely, the regulatory duration corresponds to two periods of 45 minutes separated by a period of 15 minutes. During this third period, also called half-time, the players get some rest and the coaches of the football teams adapt their strategies. During some competitions, a team must absolutely win. Equal scores cannot be accepted. At the end of both 45-minute periods of playing time, both teams must meet again for two new periods also called two extra-time periods of 15 minutes each. There is generally no period of time separating said two new periods. The teams only exchange their positions on the field. At the end of these two extra-times, if no team has taken the advantage, a last period of time which is decisive is necessary: the players must shoot in turn until one of the players misses his shot and thus makes his team lose for the profit of the other one. In this type of competition, it is thus not possible to know beforehand the duration of the programme. Other examples could be considered, such as debates or cultural programmes, the real duration of which can be more or less defined and predetermined. This type of programme means problems for the operators. As a matter of fact, if the operator decides to "oversize" the period of validity, he may "offer" free-of-charge minutes of another programme. Reversely, a too short and strict duration may penalise the subscriber and deprive him or her of the conclusion of his or her programme. In general, the operator "grants", free-of-charge, a few additional minutes. If we talk about a football match again, the extra-time period or even the decisive period cannot be anticipated nor managed. To broadcast a football game, the operators generally choose, according to the prior art, a period of validity of 115 minutes plus a few minutes. The extra-time periods are considered then as a distinct programme from the one corresponding to the regulatory time duration. At the end of the regulatory time, the subscribers who wish to view the extra-time periods must then "rush" to the keyboard of their terminals, purchase the additional period, wait for the reception of an additional key PEK or the reception of the updating of the period of validity of said key so that they can view the programme. If the programme is followed by a large number of subscribers, the network used for receiving the messages LTKM carrying the keys PEK/SEK and the periods of validity may be saturated and precious minutes are missed by the subscriber who may be angry with his or her operator for having been deprived of the conclusion.

The invention aims at solving the drawbacks of the prior art by offering a simple solution mainly implemented at the subscriber's identity module in connection with a user's terminal. The invention then promotes service continuity during the broadcasting of programmes, the duration of which cannot be predicted and the broadcasting of which was the object of a Pay-Per-View type purchase.

For this purpose, it is first provided an identity module for a subscriber to a charged programme broadcasting service, said module being intended to be integrated in or connected with a terminal, with said programmes being broadcast in the form of at least an enciphered content message and at least a key message, said at least one key message carrying more particularly a timestamp and an encoded value of a traffic key thus enabling said terminal to decipher said enciphered content messages, said module including:
a memory for storing and simultaneously delivering a service key and a period of validity associated with said service key;
a key decoding means for deducing the value of the traffic from the encoded value, using said service key;
a validity controlling means for delivering to the key decoding means the service key if, and only if, the timestamp is included in the period of validity of such service key;
a dispatching means for receiving said at least one key message, extracting and transmitting more particularly the timestamp, the encoded value of the traffic key respectively to the validity control means and key decoding means;
said subscriber identity module being characterised in that:
the dispatching means is adapted for extracting and transmitting to the validity control means, information on the extension of the period of validity contained in said at least one key message, certifying that the programme is a programme extension;
the validity controlling means is adapted for interpreting said information on the extension of the period of validity and delivering the service key independently of the value of the timestamp if, and only if, said information certifies that the programme is a programme extension.

As an alternative, the dispatching means is adapted to extract and transmit to the validity controlling means a value of an extended timestamp contained in said at least one key message. Similarly, the validity controlling means is adapted for delivering the service key if and only if:
 i. the value of the extended timestamp is contained within the period of validity of said service key and
 ii. information on the extension of the period of validity is simultaneously transmitted with the value of said extended timestamp to the validity controlling means.

According to an alternative, the dispatching means is adapted for extracting and transmitting to the validity controlling means a value of an extended period of validity contained in said at least one key message. In this case, the validity controlling means is adapted for delivering the key service if and only if:
 i. the value of the timestamp is contained within the extended period of validity and;
 ii. information on the extension of the period of validity is simultaneously transmitted with the value of said extended period of validity, to the validity controlling means.

According to such an alternative, the dispatching means is adapted for extracting and transmitting to the validity controlling means a value of an initial period of validity contained in said at least one key message. In this case, the validity controlling means is adapted for delivering the service key if and only if:
 i. the value of the timestamp is contained within the extended period of validity; and
 ii. information on the extension of the period of validity is simultaneously transmitted with the value of said extended period of validity to the validity controlling means; and
 iii. said initial period of validity is at least contained within the period of validity.

The invention further relates to a terminal for viewing a content broadcast using a mobile television broadcast network if the latter integrates an identity module such as previously described.

The invention further relates to a charged programme server broadcast using a broadcast network including means for encoding a sound and/or visual content using:
 a first encipherment key for enciphering said content and delivering at least one enciphered content message;
 a second encipherment key for enciphering said first encipherment key and delivering at least one key message;
 characterised in that the encoding means adds to said at least one key message information on the extension of the period of validity certifying that the broadcast programme is a programme extension.

As an alternative, the server encoding means according to the invention adds to said at least one key message a value of an extended timestamp if, and only if, said at least one key message includes information on the extension of the period of validity certifying that the broadcast programme is a programme extension and in that said value of the extended timestamp is contained within a period of validity associated with the second encipherment key.

According to an alternative, the server encoding means adds to said at least one key message an extended period of validity if, and only if, said at least one message includes information on the extension of the period of validity certifying that the broadcast programme is a programme extension and in that the value of the timestamp is contained within said extended period of validity.

According to such alternative, said encoding means can further add to said at least one key message an initial period of validity if, and only if, said at least one key message includes information on the extension of the period of validity certifying that the broadcast programme is a programme extension.

Other characteristics and advantages will appear more clearly when reading the following description and examining the appended Figures, among which:
 FIG. 1 shows a known mobile television system;
 FIG. 2 shows a mobile television system according to the invention;
 FIG. 3 describes a message STKM according to the prior art and according to the invention;
 FIG. 4a shows the description of an identity module according to two embodiments;

Figure 1:
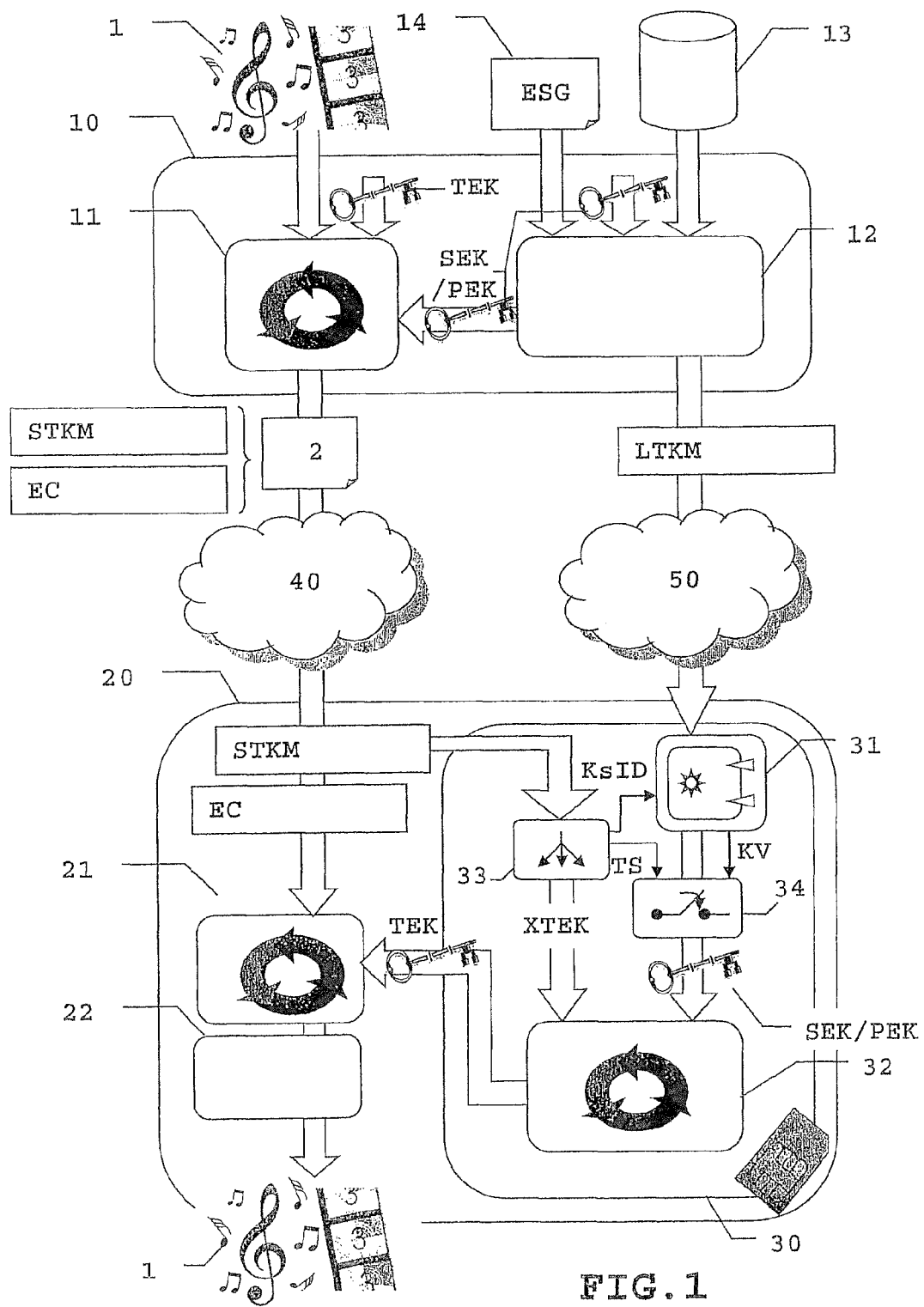

FIG. 1 shows a known mobile television system. The charged contents 1 are broadcast from a server 10. The contents 1 are previously encoded using an encoder 11. The encoded contents 2 are broadcast through a broadcast network 40 of the DVB-H type. Therefore, the encoder 11 delivers enciphered content EC messages. The encoder 11 further delivers messages STKM (Short-Term Key Messages) containing in particular the enciphered value XTEK of a traffic key TEK (Traffic Key) associated to said enciphered content messages. The traffic key is a decipherment key which will be used in fine by the subscriber's terminal 20 to enable the viewing and listening to the broadcast content 1. The value XTEK carried by the messages STKM is also encoded using in particular a service key SEK (Service Encryption Key) or PEK (Program Encryption Key).

The content encipherment key (thus the associated traffic key TEK) regularly evolves over time. The key SEK or PEK evolves according to a period of time which is longer than that of the key TEK.

The contents broadcast via the network 40 are received by the user's terminal 20 having taken out a subscription to view the mobile television service. The terminal 20 includes or is in connection with a subscriber identity module 30. The module 30 is preferably in the form of a chip card of the UICC type. Alternatively, it could be totally integrated in the terminal. The module 30 includes a processing unit not shown in FIG. 1. The module 30 further includes a memory 31, the reading and writing access to which is regulated. The memory 31 stores the values of the key SEK or PEK. Such key is transmitted to the identity module 30 (via the terminal 20) through the radio-communication network 50 using the messages LTKM (Long-Term Key Messages). Said messages are delivered and broadcast by the server 10. The latter takes into account information relating to the subscriber subscription stored by the means 13. The messages LTKM are prepared at the server 10 by a subscription managing means 12. Elements ESG (Electronic Service Guide) are also broadcast by means 12 and 50. As an alternative, elements ESG can also be broadcast by means 40.

The terminal 20 decodes the enciphered content EC messages, using a content decoding means 21. The decoding means 21 uses a content decipherment key TEK also called a traffic key. Said key TEK is delivered by a key decoding means 32 implemented by the identity module 30. The key TEK is deduced after the decoding of the value XTEK contained in the messages STKM transmitted by the terminal 20 to the subscriber's module. The key decoding means 32 uses, for deducing the key TEK, a key SEK or PEK the value of which is contained in a memory 31.

The enciphered content EC messages are decoded by the content decoding means 21 and delivered to visual and sound reproduction means of the terminal, so that the subscriber can enjoy the broadcast charged content 1.

It is possible to have a plurality of keys PEK or SEK in a memory 31. Said messages STKM further include an identifier KsID (Service Key Identifier) for indicating the identity module that the PEK or SEK must use, so that the decoding means 32 can deduce the key TEK from the messages STKM. Such identifier KsID is described in connection with FIG. 3 having the known structure (a) of a message STKM. It corresponds to the element 101 of a message STKM. This identifier is possibly communicated through a dispatching means 33 to the memory 31 so that the latter delivers the key SEK or PEK designated by the identifier. The dispatching means 33 can be in the form of a unidirectional bus or in the form of any device responsible for dispatching the contents of the messages STKM to the various components of the subscriber's identity module 30.

To carry the previously encoded traffic key TEK, a message STKM includes an element 102 containing the value XTEK corresponding to the result of an encipherment function using a key SEK or PEK. The mention "SEK/PEK(TEK)" refers to said operation. The element 102 carries the encoded value XTEK of the key TEK. The dispatching means 33 of the module 30 transmits to the decoder 32 the enciphered value XTEK of the key TEK for decoding purposes.

A key SEK or PEK can be associated with a period of validity noted KV. Such information is transmitted by the subscription manager 12 through a network 50 to the messages means LTKM. The period of validity is associated with the key SEK or PEK and is stored in the memory 31.

Figure 3:
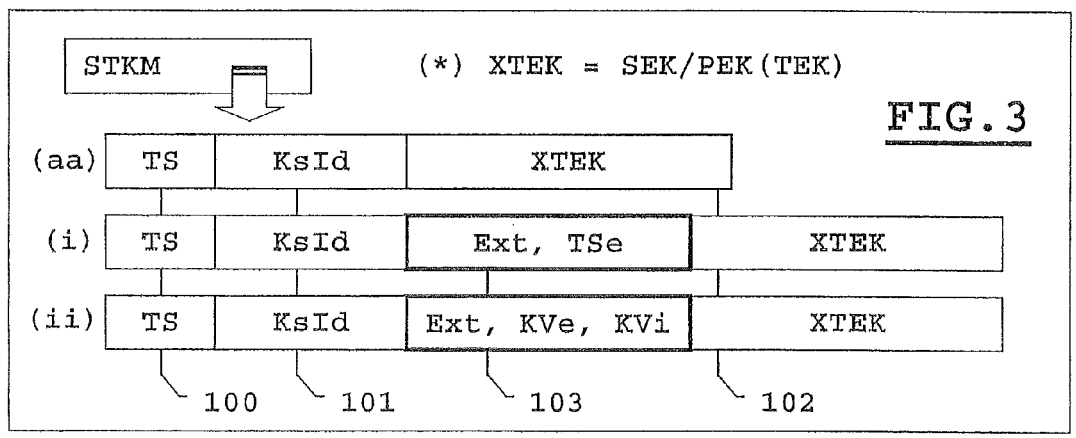

A message STKM includes, according to FIG. 3 and according to the prior art (aa), an element 100 containing the value of a timestamp. To be able to use a key SEK or PEK and thus to deduce a key TEK, the value TS of the timestamp must be contained within the period of validity associated with said key SEK or PEK. In connection with FIG. 1, a validity controlling means 34 included in the module 30 thus makes it possible to deliver to the decoding means 32 the key SEK or PEK only when the value TS of the message STKM is contained within the period of validity of the key SEK or PEK.

If the value TS is not contained within the period of validity KV, the key decoding means 32 cannot deliver the key TEK. Consequently, the content decoding means 21 included in the terminal 20 cannot decipher the EC messages. The broadcast programme or content is not delivered encoded to the subscriber through the means 22 in the terminal 20, said means 22 being responsible for the visual and/or sound reproduction.

As an example, according to the prior art, when a subscriber wishes to purchase the viewing of a particular programme, for example a football match broadcast on Feb. 14, 2007, between 9 p.m. and 10.45 p.m., the subscriptions manager 12 delivers a message LTKM carrying a key PEK associated with a period of validity running from Feb. 14, 2007, 9 p.m. till Feb. 14, 2007, 10.45 p.m.

Not to penalize its subscriber, the operator grants a few minutes free-of-charge, so that the subscriber does not miss the end of the game, in case of stops of play. Therefore, the period of validity can be "oversized" and end on Feb. 14, 2007 at 10.50 p.m.

To provide, if need be, an additional period corresponding to the extra-time periods, the operator supplies either a distinct programme or a possibly charged updating of the period of validity of the service key. The subscriber must then perform a cumbersome and risky management to be able to see the whole of the football game.

The invention proposes to solve this drawback by making it possible to get rid of any individual management at the server 10.

The invention provides:
in connection with FIG. 3, to enrich the content of messages STKM;
in connection with FIGS. 2, 4a, 4b and 4c to adapt the subscriber identity module 30 and more precisely the validity controlling means 34 so that it can take into account a "virtual" extension of the period of validity of the service key.

The subscriber can see the whole of the match without even noticing that the invention has been implemented. Then, he or she has got rid of any handling to enjoy the programme extension.

FIG. 3 shows, according to one embodiment of the invention, an enriched message (i) of the STKM type. Thus it includes an additional and optional element 103. The element 103, when it exists, includes information "Ext" for "Extension" and possibly information "TSe" for "Time Stamp for extension". FIG. 3 further shows, according to another embodiment (ii) of the invention, an enriched message (i) of the STKM type. It thus includes an additional and optional element 103. The element 103, when it exists, includes information "Ext" for "Extension", information "KVe" for "Key Validity for extension" and possibly information "KVi" for "initial Key Validity".

Several embodiments exist for the implementation of the invention. Without affecting the scope of the invention, we shall explain in details four embodiments. Then, we shall analyse, using FIG. 4a, the utilisation of an enriched message STKM according to the mode (i) and, using FIGS. 4b and 4c, the utilisation of an enriched message STKM according to the mode (ii).

Figure 2:
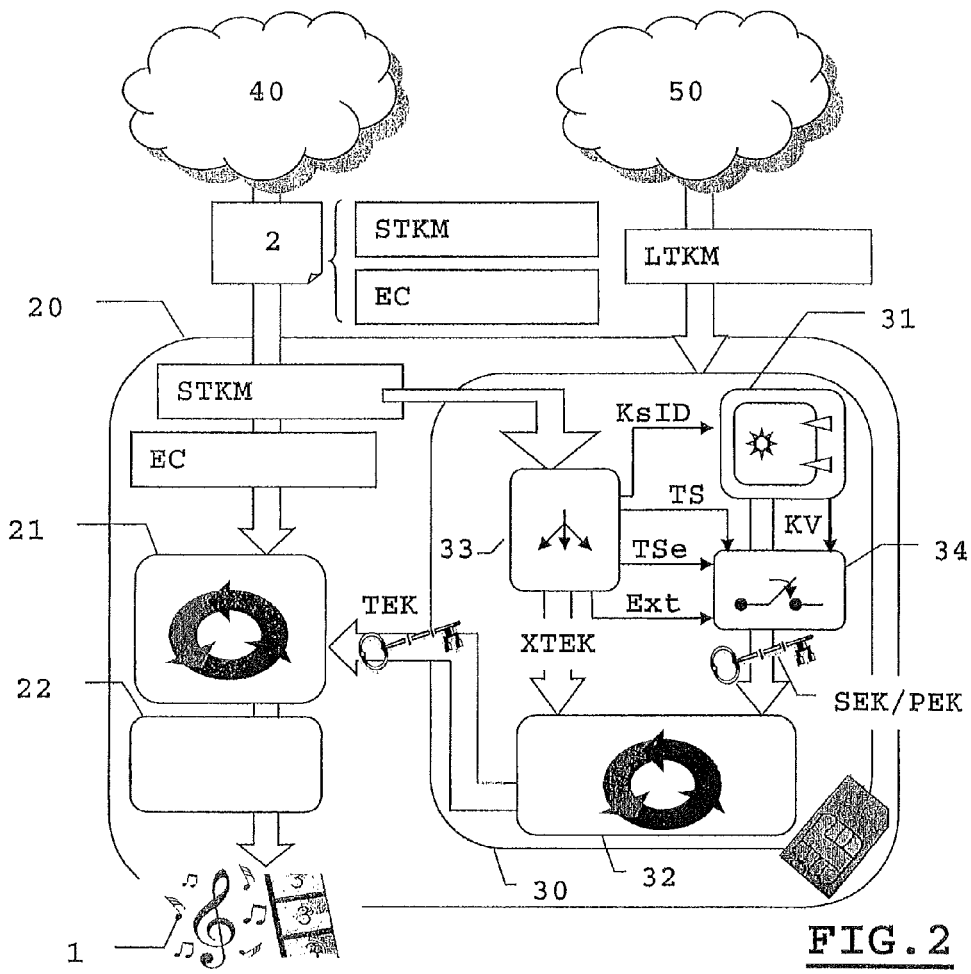

In connection with FIG. 2 and according to the invention, the dispatching means 33 of the subscriber identity module is adapted for transmitting, in addition to the identifier KsID, to the memory 31 and the value TS of the time stamp to the validity controlling means 34, a first information "Ext" mentioning that the message STKM is associated to the programme extension. Such information comes from element 103 of the message STKM. The dispatching means 33 may transmit to the validity controlling means 34 a value TSe, optionally extracted from the element 103. The value TSe corresponds to the value of an extended time stamp. The latter aims at being substituted, for using the validity controlling means 34, for the value of the time stamp TS, carried in the message STKM. The value TS is still used for maintaining the synchronisation of audio and video fluxes.

The validity controlling means 34 aims at comparing the value TS of the element 100 with the period of validity KV of the key SEK/PEK concerned. According to the invention, a first embodiment (b) consists in adapting the dispatching means 33, so that it transmits the information "Ext" to the validity controlling means. The validity controlling means 34 is adapted so that, if it recognises the characteristic value of the information "Ext" coming from the element 103, it delivers the key SEK/PEK whatever the value TS transmitted anyway.

According to a second embodiment a, the dispatching means 33 further transmits a value TSe associated with the information "Ext". The validity controlling means 34 is then adapted so that it can use, instead of information TS, information TSe upon the implementation of the operation of comparison within the key period of validity. The information TSe is calculated by the broadcast server 10 to match a value contained within the period of validity of a key SEK/PEK possibly using the identifier KsID. So as to better understand such two embodiments in connection with FIG. 4a, we shall discuss the modes (a) and (b) successively.

Thus, according to a preferred embodiment (a), the validity controlling means 34 includes a switching means 343 for delivering or not delivering the key SEK/PEK delivered by the memory 31. The switching means 343 is controlled with information delivered by an operator 341, the function of which consists in comparing two values. The first value is TS', the second value is the period of validity KV of the designated key. The comparing operator 341 delivers the value "y" if the value TS' is contained within the period of validity KV. He answers "n" if not so. The switching means 343 delivers the key if, and only if, the comparing operator 341 delivers the value "y". To compute the value TS', the validity controlling means 34 implements a decoding means 342. The function of said means 342 is to output one of the two values it received as an input. The selection is made by taking advantage of one parameter. This parameter is granted the value "Ext". The values TS and TSe are respectively routed to two inlets of said decoding means 342. Thus, if the value "Ext" corresponds to the characteristic value of a programme extension, the decoding means 342 outputs a value TS' equal to the value TSe. If not so, the output value TS' corresponds to the value TS. In the case where the value TSe is determined to be contained within the period of validity KV, it should be understood that, whatever the value TS, the validity controlling means 34 delivers the key SEK/PEK designated. Let us consider the example of the football game again. For the regulatory time (which means for the first 115 minutes), the associated messages STKM contained no element 103 including information, the value of which is characteristic of a programme extension. The validity controlling means uses the value TS to perform a validity test (via the comparing means 341). At the end of the first 115 minutes, if the messages STKM include no element 103 including an information "Ext" characteristic of a programme extension, the value TS of the time stamp becomes greater than the upper boundary of the period of validity KV of the key. The operator 341 delivers an output which is different from "y" and the switching means 343 no longer delivers the key SEK/PEK. The traffic key TEK is no longer decoded and thus the deciphered programme is no longer reproduced. Reversely, according to the invention, the server 10 delivers messages STKM including an element 103 including information "Ext" characteristic of a programme extension. The server further delivers a value TSe included within the period of validity. The operator 341 thus delivers an output equal to "y" and the switching means 343 delivers the key SEK/PEK. The decoding of the traffic key TEK can be implemented by the key decoding means 32. The reproduction of the deciphered programme goes on through the implementation in the terminal 20 of the content decoding means 21 and the means 22 responsible for the visual and sound reproduction.

According to a second embodiment b, the validity controlling means 34 includes a switching means 343 for delivering or not delivering a key SEK/PEK delivered by the memory 31. The switching means 343 is controlled using information delivered by decoding means 345. The function of said decoding means 345 consists in outputting one of the two values it received as an input. The selection is carried out by exploiting a parameter. The parameter receives the value "Ext". The first input receives the value "y". The second input receives the output from a comparing means 341. The function of said comparing means 341 consists in comparing two values. The first value is TS, the second value is the period of validity KV of the designated key. The comparing operator 341 delivers the value "y" if the value TS is contained within the period of validity KV. It answers "n" if not so. The switching means 343 delivers the key if, and only if, the decoding means delivers the value "y". In the case where the parameter of the decoding means 345 receives the "Ext" it should be understood that, whatever the value TS, the controlling means 34 delivers the designated key SEK/PEK. If not so, the validity controlling means 34 tests, as in the prior art, the validity of the stamp TS, as regards the period of validity of the designated key SEK/PEK. Therefore, it implements the comparative means beforehand. If we mention again the example of the football game during the regulatory time (i.e. during the first 115 minutes), the associated messages STKM do not include any element 103 including information the value of which is characteristic of a programme extension. The validity controlling means uses the value TS to carry out the validity test (via the comparative means 341). At the end of the first 115 minutes, if the messages STKM do not contain an element 103 including information "EXT" characteristic of a programme extension, the value of TS of the time stamp will be greater than the upper boundary of the period of validity KV of the key. The operator 341 will deliver an output which is different from "y". This value is transmitted through the decoding means 345 using the interrupting means 343. The latter does not deliver the key SEK/PEK. The traffic key TEK is no longer encoded. The reproduction of the deciphered programme is interrupted. Reversely, according to the invention, the server 10 delivers messages STKM including an element 103 containing information "Ext", characteristic of a programme extension. The operator 345 delivers an output equal to "y". Independently of the value delivered by the comparative means 341, the switching means 343 delivers the key SEK/PEK. The decoding of traffic TEK can be implemented by the decoding means through the key decoding means 32. The reproduction of the deciphered programme goes on through the implementation in the terminal 20 of the content decoding means 21 and the means 22 responsible for the visual and sound reproduction.

One of the advantages of the embodiment (a) with respect to the embodiment (b) lies in the possibility of limiting the virtual extension of the period of validity of the key SEK or PEK. Although the presence of the information "Ext" guarantees in itself the extension of validity, the embodiment (b) eliminates any condition to the extension. By using the extended time stamp TSe, the operator may more finely manage the extension of offer therefor. As a matter of fact, let us take as an example, a mobile television programme in the form of a series of contradictory debates. It is possible to cut the offer in as many programmes as debates and thus determine the different periods of validity for the same service key. Various subscribers may "purchase" one, two or several debates. The value TSe makes it possible to designate the debate concerned by the offer extension. Thanks to this value TSe, it is not necessary to have different SEK/PEK services for a debate, which is the only alternative with this embodiment (b). As a matter of fact, according to the embodiment b( ) a subscriber having subscribed to a key only for the first debate thus having a period of validity for the key which is sized accordingly, could not only take advantage of the offer extension for the first debate but for the following ones, free of charge. Solutions (a) or (b) are thus complementary.

As regards the server 10, it is sufficient to encode a programme extension using the key SEK or PEK associated with a given period of validity and to precise in the element 103 the associated messages STKM related to this content, that the broadcast programme is of the "programme extension" type. If need be, the messages STKM further include the extended time stamp TSe, the value of which is adapted to the situation.

Figure 4A:
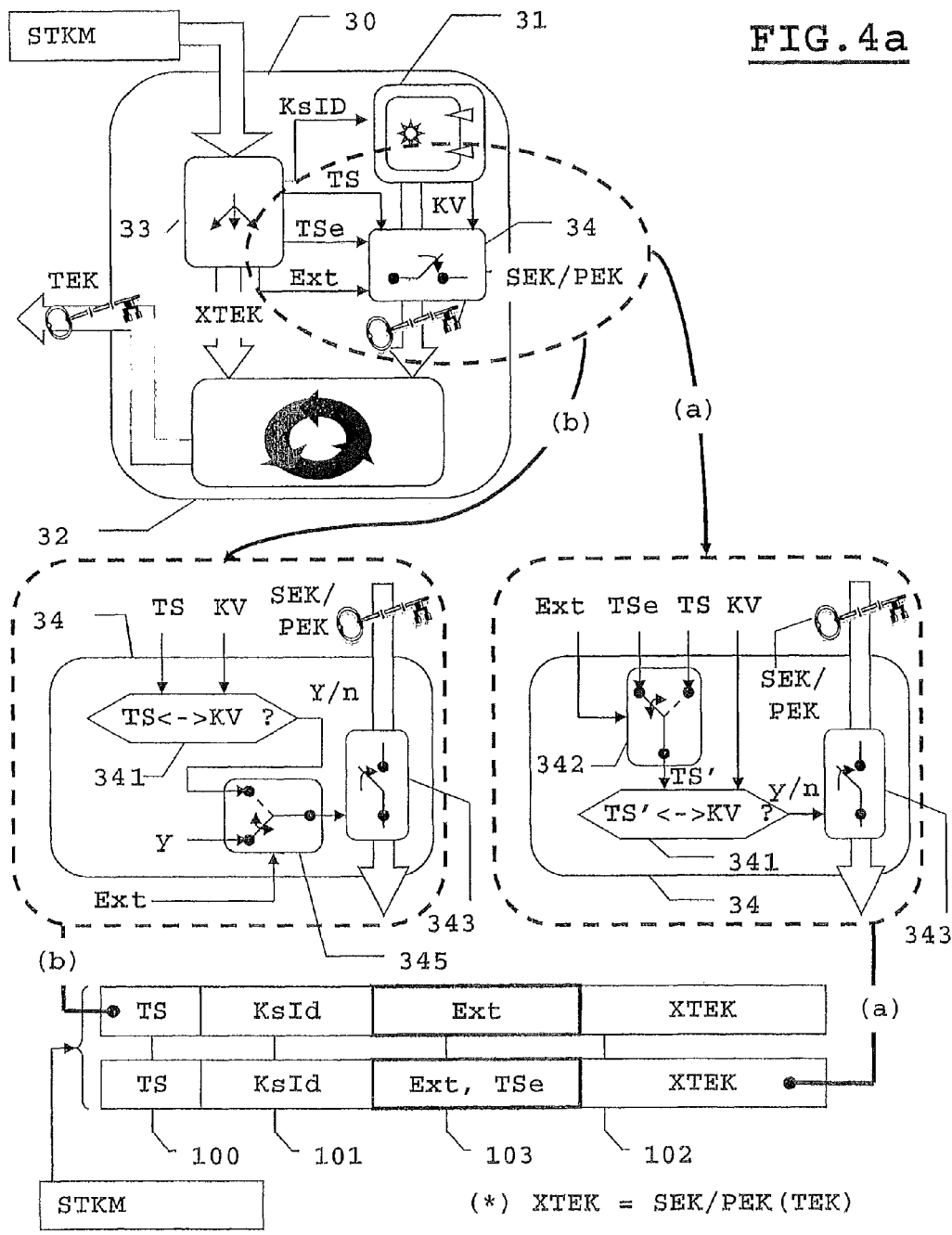
FIG. 4b shows the description of an identity module according to a third embodiment.
FIG. 4c shows the description of an identity module according to a fourth embodiment.

In addition, it is possible to provide an embodiment of the validity controlling means 34, so that the latter can have two operation modes disclosed in connection with FIG. 4a. Thus, if one information "Ext" exists in the element 103 certifying that the message STKM is associated with a programme extension, the presence or absence of the value TSe enables said means 34 to automatically adapt the configuration thereof to implement the configuration (a) if the extended time stamp TSE exists, or the configuration (b) if only information "Ext" exists.

Figure 4B:
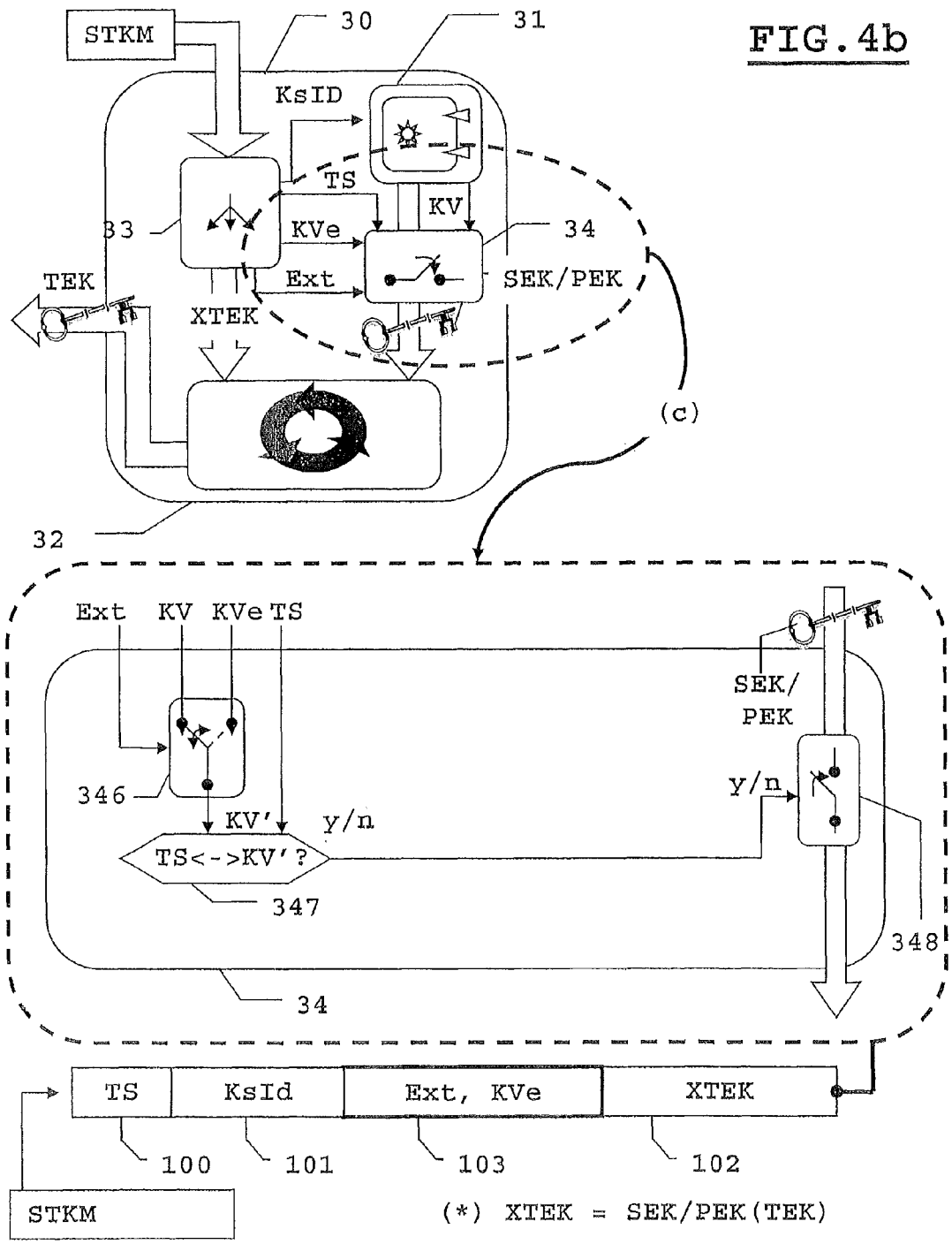

In connection with FIG. 4b, according to one embodiment (c), the validity controlling means 34 includes a switching means 348 for delivering or not delivering the key SEK/PEK put at its disposal by the memory 31. The switching means 348 is controlled using information delivered by a comparing operator 347, the function of which consists in comparing two values. The first value is value KV', the second value is the value TS of the time stamp. The comparing operator 347 delivers the value "y" if the value TS is contained within the period of validity KV'. It answers "n" if not so. The switching means delivers the key if, and only if, the comparing operator 347 delivers the value "y". For computing the value KV', the validity controlling means 34 uses a decoding means 346. Said means 346 aims at outputting one of the two values it receives as an input. The selection is made by exploiting a parameter. This parameter receives the value "Ext". The values KV and KVe are respectively routed to two inputs of said decoding means 347. Thus, if the value "Ext" corresponds to the value characteristic of a programme extension, the decoding means 347 outputs a value KV' equal to the value KVe. If not so, the output value KV' corresponds to the value KV. In the case where the value TS is contained within the period of validity KVe, it should be understood that, whatever the value KV, the validity controlling means 34 delivers the key SEK/PEK designated. Let us mention again the example of the football match. During the regulatory time, i.e. during the first 115 minutes, the associated messages STKM include no element 103 including information, the value of which is characteristic of a programme extension. The validity means 34 uses the value TS and KV to perform a validity test via the comparative means 347. Upon completion of the first 115 minutes, if the messages STKM include no element 103 including information "Ext" characteristic of a programme extension, the value TS of the time stamp becomes greater than the upper boundary of the period of validity KV of the key. The operator 347 delivers an output which is different from "y", and the switching means 348 no longer delivers the key SEK/PEK. The traffic key TEK is no longer decoded and thus the deciphered programme is no longer reproduced. Reversely, according to the invention, the server 10 delivers messages STKM including an element 103 containing information "Ext", characteristic of a programme extension. The server further delivers a period Kve which is longer than the initially planned period potentially equal to KV. The operator 347 then delivers an output equal to "y" and the switching means 348 delivers the key SEK/PEK. The decoding of the traffic key TEK can be implemented by the key decoding means 32. The reproduction of the decoded programme goes on through the implementation in the terminal 20 of the content decoding means 21 and the means 22 in charge of the visual and sound reproduction.

Figure 4C:
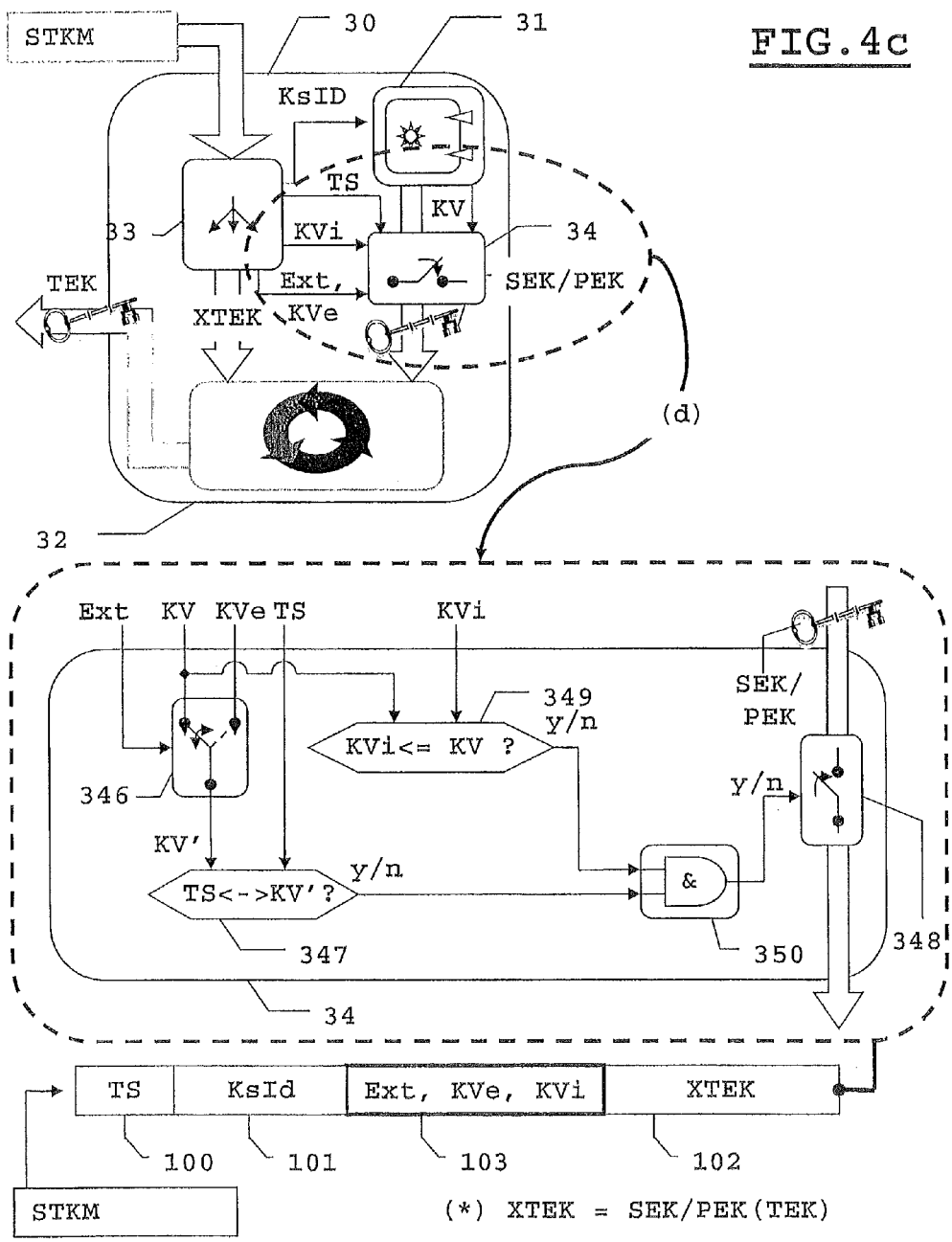

Referring to FIG. 4c, according to one embodiment (d), the validity controlling means 34 takes the elements 348, 347, 346 discussed in connection with FIG. 4b. The means 34 further includes a comparing operator 349 the function of which consists in comparing two values. The first value is the validity value KV delivered by the memory 31. The second value is a period KVi. It corresponds to a minimum period to be able to view the initially planned programme. In the example of the football match, this period KVi covers the regulatory periods of time. The value KVi is carried by the messages STKM. KVi is extracted by the dispatching means 33 and is communicated to the validity controlling means 34. Generally speaking, the period KVi corresponds at least to the period KV. The operator comparator 349 delivers the value "y" if the period value KVi is at least contained within the period KV. It answers "n" if not so. The respective answers of the comparing operator 349 and the comparing operator 348 are preferably put at the disposal of inputs of a logical gate 350, a means in charge of outputting the answer "y" if, and only if, the operators 348 and 349 delivered the answer "y". If one of the comparing operators 348 or 349 answers "n" then the gate 350 delivers the answer "n". The output of said gate controls the switching means 348. The switching means 348 delivers the key if, and only if, the comparing operator 347 and the comparing operator 349 deliver the value "y".

The parameter KVi enables the subscriber to enjoy the extension of the period of validity only when said subscriber previously purchased the whole period KVi minimum. KVi thus makes it possible to limit said service extension.

It is also possible to provide an embodiment of the validity controlling means 34, that the latter may have both operation modes (c) and (d) described at its disposal in connection with FIGS. 4b and 4c. Thus, if information "Ext" exists in the element 103 certifying that the message STKM is associated with a programme extension, the presence or the absence of the value KVi enables said means 34 to automatically adapt the configuration thereof, to implement the configuration (d) if the initial period of validity KVi exists or the configuration (c) if only information "Ext" and KVe exist.

Similarly, it is possible that the validity controlling means 34 changes for the configuration (a), (b), (c) or (d) as a function of the values extracted and put at the disposal thereof by the dispatching means 33.

In addition, the FIGS. 4a, 4b and 4c illustrate logic representations of four embodiments of the validity controlling means 34. Other methods or devices can be imagined for defining the embodiment of said means 34 without limiting the present invention.

The validity controlling means 34 can also be partially or integrally carried out in the form of software implemented by the processing unit (not shown in FIGS. 2, 4a, 4b, 4c) of the subscriber identity module 30.

The invention further applies to any broadcast type system for which it is necessary to provide an extension, free-of-charge, of the period of validity of the service.

This extension can also be optional and be operational only upon taking out the subscription. The extension of the period of validity makes it possible to improve the service rendered with the subscribers.

The invention claimed is:

1. An identity module of a subscriber to a program broadcasting service, said identity module configured to communicate with a terminal, wherein at least one program being broadcast in the form of at least one message includes an enciphered content and at least one key message, said at least one key message including an enciphered value of a traffic key, the traffic key enabling said terminal to decipher said enciphered content included within said at least one message, said identity module comprising:
 a memory for storing a service key for deciphering the traffic key, wherein said identity module is further configured to (i) extract, from said at least one key message, validity period extension information, and (ii) transmit, if the validity period extension information certifies that said at least one key message is associated with a program extension, to the terminal, a value of the traffic key associated with the enciphered content.

2. The identity module according to claim 1, wherein the memory simultaneously stores and delivers the service key for deciphering the traffic key, and said identity module further includes:
 a key deciphering means for deducing the value of the traffic key from the enciphered value, by using said service key;
 a validity controlling means for delivering, to the key deciphering means, the service key; and
 a dispatching means for
 (i) receiving said at least one key message,
 (ii) extracting, from said at least one key message, at least one piece of information, and
 (iii) transmitting the validity period extension information to the validity controlling means if the validity period extension information certifies that said at least one key message is associated with a program extension,
 wherein the validity controlling means is adapted to interpret said validity period extension information and, if said validity period extension information certifies that said at least one key message is associated with a program extension, deliver the service key.

3. The identity module according to claim 2, wherein
 said at least one key message further includes a timestamp,
 the memory stores and simultaneously delivers (i) the service key for deciphering the traffic key and (ii) a period of validity associated with said service key,
 the validity controlling means delivers, to the key deciphering means, the service key if the timestamp is included within the period of validity of the service key;
 the dispatching means extracts the timestamp and the enciphered value of the traffic key and transmits the extracted timestamp and enciphered value to the validity controlling means and the key deciphering means, respectively, and is further configured to extract and transmit, to the validity controlling means, the validity period extension information, said validity period extension information being included within said at least one key message and certifying that said at least one key message is associated with a program extension, and
 the validity controlling means is configured to interpret said validity period extension information and, if said validity period extension information certifies that said at least one key message is associated with a program extension, deliver the service key independently from the timestamp value.

4. The identity module according to claim 2, wherein
 the dispatching means is configured to extract and transmit, to the validity controlling means, a value of an extended timestamp included within said at least one key message, and
 the validity controlling means is configured to deliver the service key if:
 (i) the value of the extended timestamp is included within said service key validity period, and
 (ii) validity period extension information is simultaneously transmitted with the value of said extended timestamp to the validity controlling means.

5. The identity module according to claim 2, wherein
 the dispatching means is configured to extract and transmit, to the validity controlling means, a value of an extended validity period included within said at least one key message, and
 the validity controlling means is configured to deliver the key service if:
 (i) the value of the timestamp is included within the extended validity period, and
 (ii) validity period extension information is simultaneously transmitted, with the value of said extended validity period, to the validity controlling means.

6. The identity module according to claim 5, wherein
the dispatching means is further configured to extract and transmit, to the validity controlling means, a value of an initial validity period included within said at least one key message, and
the validity controlling means is further configured to deliver the service key if:
(i) the value of the timestamp is included within the extended validity period,
(ii) validity period extension information is simultaneously transmitted, with the value of said extended validity period, to the validity controlling means, and
(iii) said initial validity period is at least included within the validity period.

7. A system for viewing at least one broadcast content using a broadcast network for mobile television, the system comprising:
a terminal; and
an identity module configured to communicate with the terminal, wherein
at least one program is broadcast in the form of at least one message including an enciphered content and at least one key message, said at least one key message including an enciphered value of a traffic key, the traffic key enabling said terminal to decipher the enciphered content included within said at least one message,
said identity module is configured to:
(i) extract, from said at least one key message, validity period extension information, and
(ii) transmit, if the validity period extension information certifies that said at least one key message is associated with a program extension, to the terminal, a value of the traffic key associated with the enciphered content, and
said terminal is configured to decipher the enciphered content included within said at least one message by using the value of the traffic key received from the identity module.

8. A program server device, using a broadcast network, comprising:
an encoder, implemented within the server device, for encoding a sound and/or visual content, wherein the encoder is configured to:
(i) encipher said sound and/or visual content using a first encipherment key and deliver at least one enciphered content message,
(ii) encipher said first encipherment key using a second encipherment key and deliver at least one key message,
(iii) add, within said at least one key message, validity period extension information to certify that said at least one key message is associated with a program extension and an enciphered value of the first encipherment key to enable a terminal to decipher enciphered content included within said at least one key message.

9. The program server device according to claim 8, wherein the encoder is further configured to add, within said at least one key message, an extended timestamp if said at least one key message includes validity period extension information to certify that said at least one key message is associated with a program extension and wherein a value of the extended timestamp is included within a validity period associated with the second encipherment key.

10. The program server device according to claim 8, wherein the encoder is further configured to add, within said at least one key message, an extended validity period if said at least one message includes validity period extension information enabling to certify that said at least one key message is associated with a program extension and wherein a value of the timestamp is included within said extended validity period.

11. The program server device according to claim 10, wherein the encoder is further configured to add, within said at least one key message, an initial validity period if said at least one key message includes validity period extension information enabling to certify that said at least one key message is associated with a program extension.

* * * * *